(12) United States Patent
Wang et al.

(10) Patent No.: US 7,656,433 B2
(45) Date of Patent: Feb. 2, 2010

(54) WEB CAMERA

(75) Inventors: Chi-Hsien Wang, Yonghe (TW); Wen-Ming Huang, Dasi Township, Taoyuan County (TW); Wei-Song Yeh, Jhudong Township, Hsinchu County (TW); Chun-Chieh Lin, Jhonghe (TW); Kuan-Chou Chen, Taipei (TW)

(73) Assignee: Genesys Logic, Inc., Taiipei (TW)

( * ) Notice: Subject to any disclaimer, the term of this patent is extended or adjusted under 35 U.S.C. 154(b) by 368 days.

(21) Appl. No.: 11/707,967

(22) Filed: Feb. 20, 2007

(65) Prior Publication Data
US 2007/0195168 A1    Aug. 23, 2007

(30) Foreign Application Priority Data
Feb. 22, 2006    (TW) ............................. 95202971 U

(51) Int. Cl.
*H04N 5/228*    (2006.01)
*H04N 5/225*    (2006.01)
*H04N 7/26*    (2006.01)

(52) U.S. Cl. ................. 348/222.1; 348/207.1; 386/109; 386/112

(58) Field of Classification Search ............... 348/207.1
See application file for complete search history.

(56) References Cited

U.S. PATENT DOCUMENTS

| | | | |
|---|---|---|---|
| 6,184,936 B1 * | 2/2001 | Hu | 348/453 |
| 6,614,486 B2 * | 9/2003 | Hu | 348/453 |
| 6,690,731 B1 * | 2/2004 | Gough et al. | 375/240.18 |
| 6,833,863 B1 * | 12/2004 | Clemens | 348/220.1 |
| 7,113,203 B1 * | 9/2006 | Wu et al. | 348/207.99 |
| 7,350,224 B2 * | 3/2008 | Creamer et al. | 725/105 |
| 7,372,485 B1 * | 5/2008 | Bodnar et al. | 348/234 |

* cited by examiner

*Primary Examiner*—Lin Ye
*Assistant Examiner*—Amy Hsu

(57) ABSTRACT

A web camera includes an image sensor, which takes an external image; a sensor interface, which is connected to the mage sensor to receive and convert the image taken by the image sensor into digital image data; at least one compression module, which is connected to the sensor interface to receive and compress the digital image data into compressed image data; and a USB interface, which is connected to the compression module to output the compressed image data to a host device having a USB interface port, such as a computer and a USB OTG device, for storage, playing back and other applications.

7 Claims, 4 Drawing Sheets

WEB CAMERA

BACKGROUND OF THE INVENTION

1. Field of the Invention

The present invention generally relates to a web camera, and in particular to a web camera that is applicable in image-taking for networks and computers and features image compression and conversion to enhance transmission speed thereof.

2. The Related Arts

Web cameras or computer cameras are readily available and are widely applied in for example video communication, network video conference or video monitoring. In the conventional web cameras, image data are transmitted through a USB interface to for example a computer directly for instantaneous displaying. However, the transmission speed of the USB interface is much slower than frame rate of the web camera taking image. This causes delay and thus asynchronization of the image data in playing back, storage, and other applications when image data are transmitted to the computer, which in turn induces burring of picture shown on the computer display.

SUMMARY OF THE INVENTION

Thus, an objective of the present invention is to provide a web camera, which comprises an image sensor for taking an external image, a sensor interface connected to the mage sensor to receive and convert the image taken by the image sensor into digital image data, at least one compression module connected to the sensor interface to receive and compress the digital image data into compressed image data, and a USB interface connected to the compression module to receive and convert the compressed image data into USB format for supplying to a host device having a USB interface port for storage, playing back and other applications, whereby the frame rate that the web camera transmits through the USB interface can be enhanced to synchronize the operation of the image, such as playing back, storage or other applications with the pick-up of the image by the image sensor.

Another objective of the present invention is to provide a web camera, wherein the compression module is capable to provide synchronous data compression for a great quantity of image data, and wherein the compressed image data can be directly output without operation performed by other circuits or devices, so as to eliminate delay, shaking, and burring of images.

To realize the above object, in accordance with the present invention, a web camera comprises an image sensor, which takes an external image; a sensor interface, which is connected to the mage sensor to receive and convert the image taken by the image sensor into digital image data; at least one compression module, which is connected to the sensor interface to receive and compress the digital image data into compressed image data; and a USB interface, which is connected to the compression module to output the compressed image data to a host device having a USB interface port, such as a computer and a USB OTG device, for storage, playing back and other applications. Thus, compression of large quantity of image data and high frame rate can be effectively realized.

BRIEF DESCRIPTION OF THE DRAWINGS

In order to clearly show and make better comprehension of these and other features and advantages of the present invention, the present invention will now be described by way of examples, with reference to a preferred embodiment illustrated in the drawings, in which.

DETAILED DESCRIPTION OF THE PREFERRED EMBODIMENT

Figure 1:
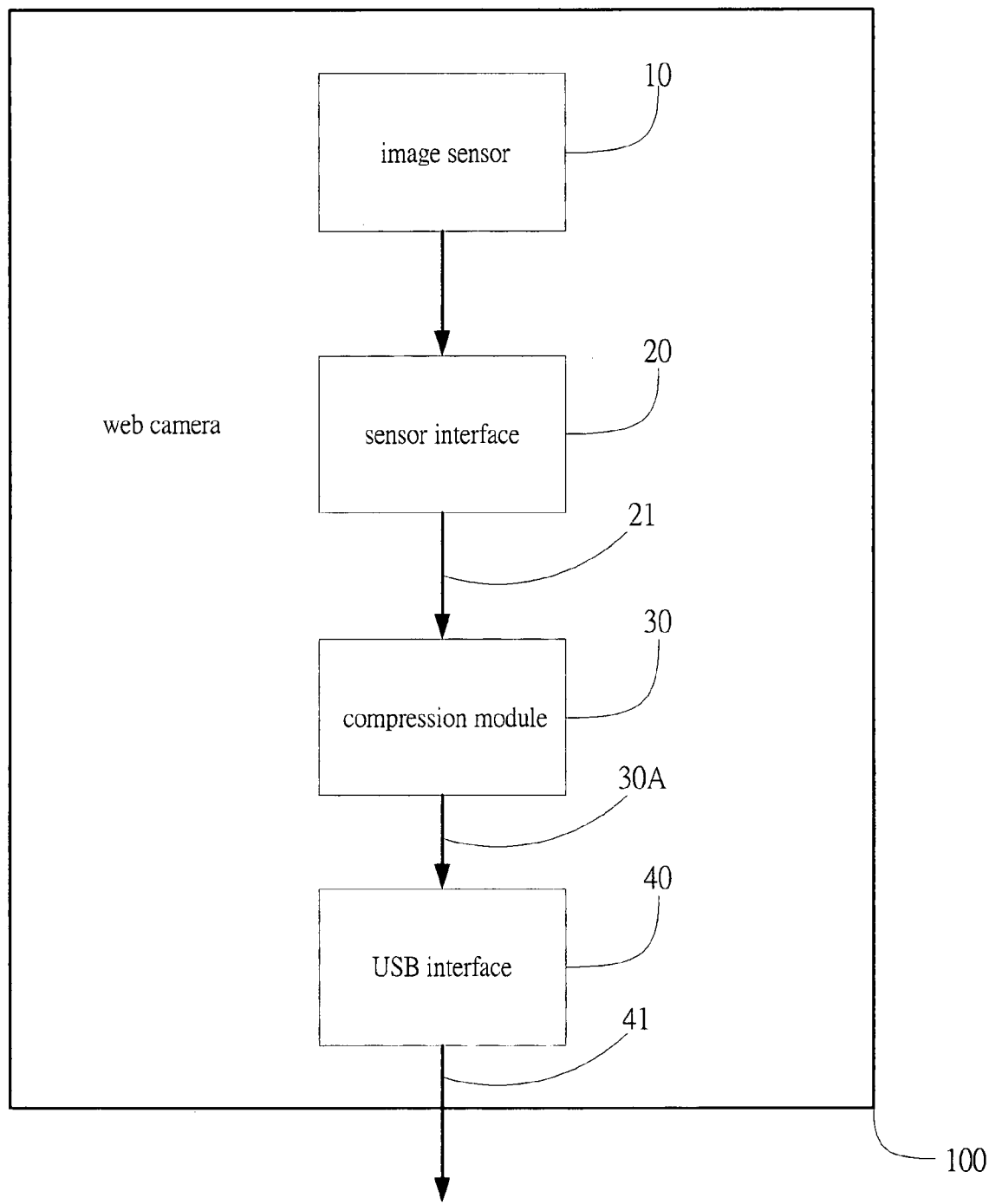
FIG. 1 shows a system block diagram of a web camera constructed in accordance with the present invention.

With reference to the drawings and in particular to FIG. 1, which shows a web camera in accordance with the present invention, generally designated with reference numeral 100, the web camera 100 comprises an image sensor 10, a sensor interface 20, at least one compression module 30, and a USB interface 40. The image sensor 10 serves to pick up an external image and can be of any known device that takes pictures. In the embodiment illustrated, the image sensor 10 comprises a CMOS image sensor. The sensor interface 20 is connected to the image sensor 10 to receive from the image sensor 10 an image taken by the image sensor 10 and converts the image into digital image data 21 for output.

The compression module 30 is connected to the sensor interface 20 to carry out compression of the digital image data 21 supplied from the sensor interface 20 and generates in response thereto compressed image data 30A. The compression module 30 can be of any type and structure and a Huffman compression module is taken as an example herein for further description. It is, however, apparent that other image compression module and structure realizing equivalent effect can be used without departing from the spirit of the present invention.

Figure 2:
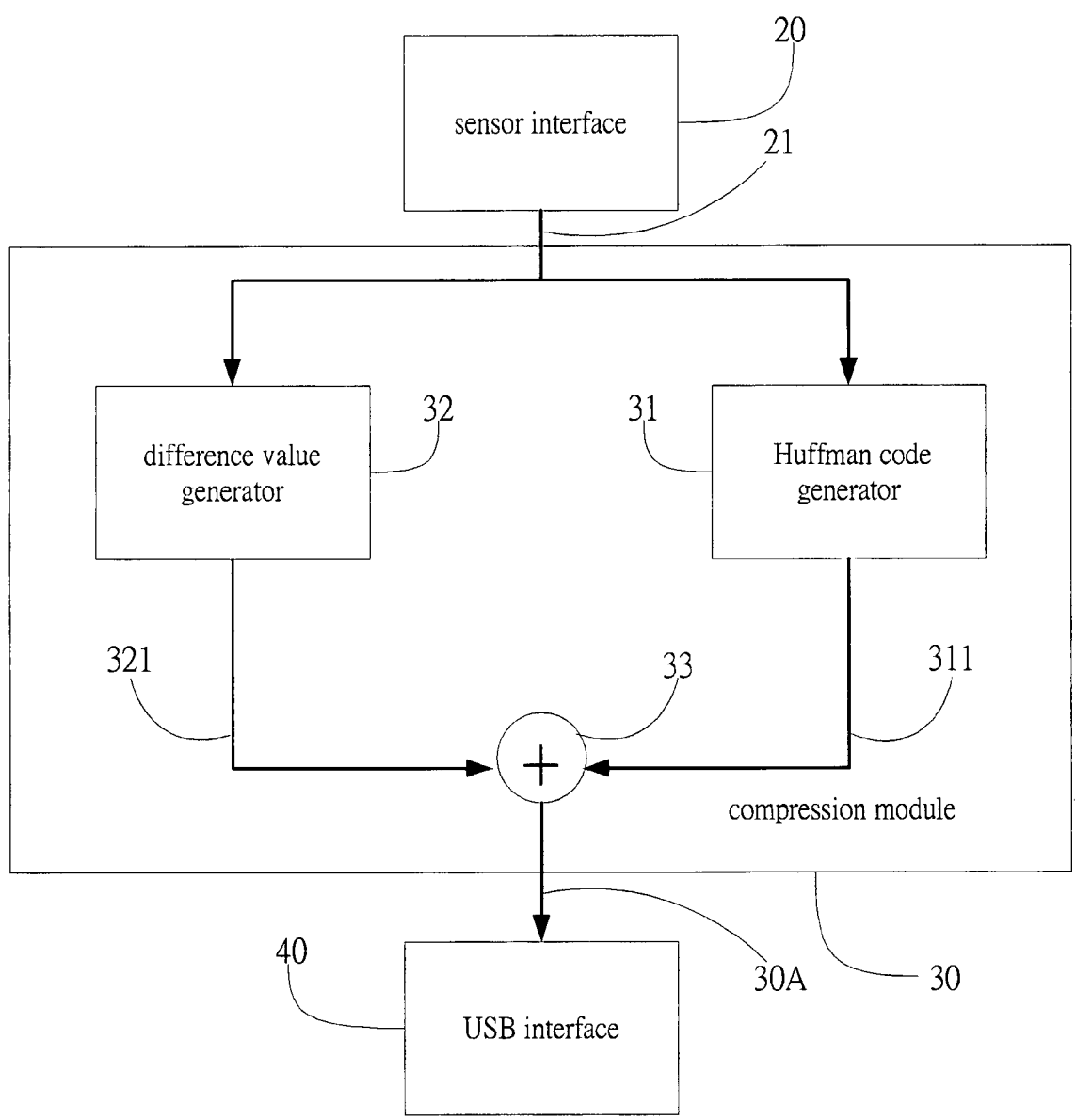
FIG. 2 is a block diagram of a compression module of the web camera of the present invention.
Figure 3:
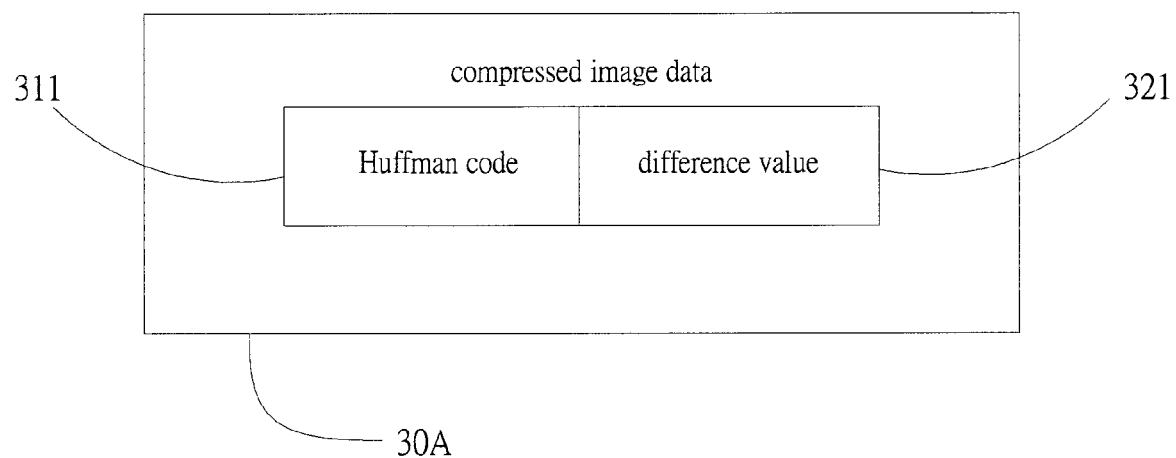
FIG. 3 shows an example format of compressed mage data supplied from the compression module of the web camera of the present invention.

Also referring to FIGS. 2 and 3, the compression module 30 comprises a Huffman code generator 31, a difference value generator 32, and an operation unit 33. The Huffman code generator 31 receives the digital image data from the sensor interface 20 and compressed the received digital image data with a Huffman compression method to generate a Huffman code 311. The difference value generator 32 calculates a difference value between RGB data and gray scale data of the digital image data 21 supplied from the sensor interface 20 and generates a difference value 321. The operation unit 33 takes operations on the Huffman code 311 generated by the Huffman code generator 31 and the difference value 321 of the difference value generator 32. The operation taken by the operation unit 33 can be any operation that is desired, and in the embodiment illustrated, an example of the operation is shown in FIG. 3, in which the Huffman code 311 is put in a high byte, while the difference value 321 is put in a low byte and are thus combined together as unitary compressed image data 30A for output.

The USB interface 40 is connected to the compression module 30 to receive the compressed image data 30A from the compression module 30 and converts the compressed image data 30A into USB image data 41 in accordance with USB format. The USB interface 4 can be of any known type, which, as an example of description herein is USB 2.0. However, other equivalent structure and device can also be adopted without departing from the scope of the present invention.

Figure 4:
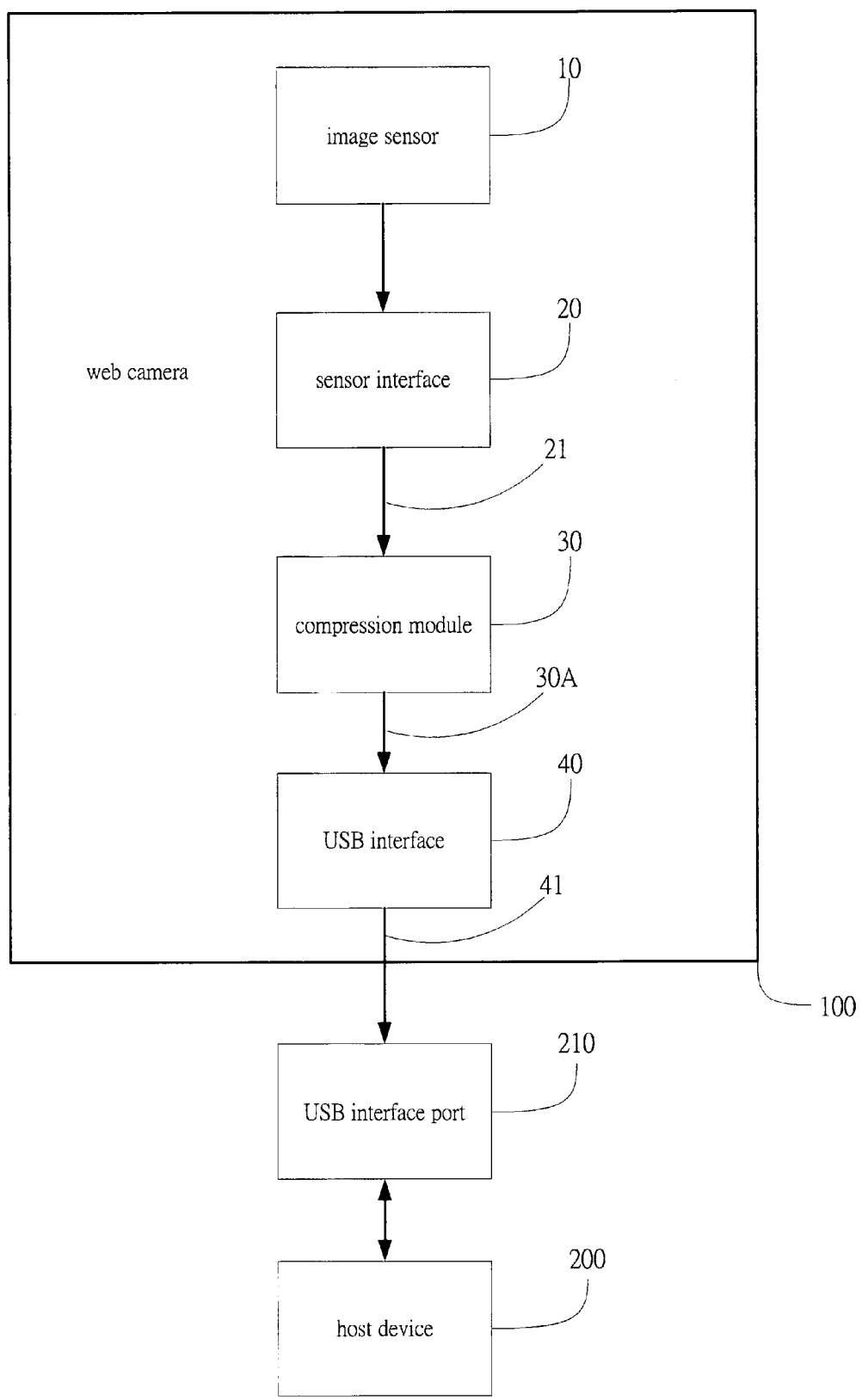
FIG. 4 is a block diagram showing an application of the web camera of the present invention.

Also referring to FIG. 4, which shows an application of the web camera 100 of the present invention, the USB interface 40 of the web camera 100 of the present invention is put into connection with a USB interface port 210 of a host device 200. The host device 200 having a USB interface port 210 can be any known device, such as a computer or a USB OTG (On-The-Go) device, which receives the USB image data 41 from the USB interface 40 for playing back, storage of other applications. The host device 200 can perform decompression to retrieve the original image data for playing back, storage and other applications. A comparison between the web camera 100 of the present invention and a conventional web camera with respect to frame rate is listed in the following table:

|  | Frame Rate | | | |
|---|---|---|---|---|
| Data Type | VGA & RGB | VGA & YUV | 1.3M & RGB | 1.3M & YUV |
| Prior Art | 30 frame/sec | 15 frame/sec | 15 frame/sec | 7 frame/sec |
| The Invention | 45-60 frame/sec | 20-30 frame/sec | 22-30 frame/sec | 11-15 frame/sec |

The above table shows that the frame rates of the web camera 100 of the present invention for a variety of applications are all higher than the prior art. Consequently, delay, shaking, and burring of images can be eliminated in the web camera 100 of the present invention.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A web camera, comprising:
   an image sensor, which is adapted to take an external image;
   a sensor interface, which is connected to the mage sensor to receive and convert the image taken by the image sensor into digital image data;
   at least one compression module, which is connected to the sensor interface to receive and compress the digital image data into compressed image data, wherein the compression module comprises an operation unit for performing an operation on a Huffman code and a difference value to generate the compressed image data, and the operation unit positions the Huffman code in a high byte and the difference value in a low byte to form unitary compressed image data; and
   a USB interface, which is connected to the compression module to receive and convert the compressed image data into USB image data.

2. The web camera as claimed in claim 1, wherein the image sensor comprises a CMOS image sensor.

3. The web camera as claimed in claim 1, wherein the compression module comprises:
   a Huffman code generator, which receives the digital image data from the sensor interface and performs Huffman compression on the digital image data to generate the Huffman code; and
   a difference value generator, which performs operation on RGB data and gray scale data of the digital image data from the sensor interface to generates the difference value.

4. The web camera as claimed in claim 1, wherein the USB interface comprises USB2.0 interface.

5. The web camera as claimed in claim 1, wherein the USB interface is mateable with a USB interface port of a host device having a USB interface port.

6. The web camera as claimed in claim 5, wherein the host device comprises a computer.

7. The web camera as claimed in claim 5, wherein the host device comprises a USB OTG device.

* * * * *